(12) United States Patent
Pauker et al.

(10) Patent No.: US 11,270,298 B2
(45) Date of Patent: Mar. 8, 2022

(54) DIGITAL CURRENCY MINING CIRCUITRY

(71) Applicant: 21, Inc., San Francisco, CA (US)

(72) Inventors: Matthew Pauker, San Francisco, CA (US); Nigel Drego, San Francisco, CA (US); Veerbhan Kheterpal, Santa Clara, CA (US); Daniel Firu, San Jose, CA (US)

(73) Assignee: 21, Inc., San Francisco, CA (US)

( * ) Notice: Subject to any disclaimer, the term of this patent is extended or adjusted under 35 U.S.C. 154(b) by 940 days.

(21) Appl. No.: 14/252,613

(22) Filed: Apr. 14, 2014

(65) Prior Publication Data

US 2015/0294308 A1  Oct. 15, 2015

(51) Int. Cl.
| | | |
|---|---|---|
| *G06Q 20/38* | (2012.01) | |
| *G06Q 20/40* | (2012.01) | |
| *G06Q 20/36* | (2012.01) | |
| *G06Q 20/06* | (2012.01) | |
| *G06Q 20/02* | (2012.01) | |
| *H04L 9/32* | (2006.01) | |

(52) U.S. Cl.
CPC ......... *G06Q 20/3827* (2013.01); *G06Q 20/02* (2013.01); *G06Q 20/0655* (2013.01); *G06Q 20/3674* (2013.01); *G06Q 20/3678* (2013.01); *G06Q 20/3829* (2013.01); *G06Q 20/401* (2013.01); *H04L 9/3242* (2013.01); *G06Q 2220/00* (2013.01); *H04L 2209/56* (2013.01)

(58) Field of Classification Search
CPC ............... G06Q 20/3827; G06Q 20/02; G06Q 20/0655; G06Q 20/3674; G06Q 20/3829; G06Q 20/401; G06Q 2220/00; G06Q 20/3678; H04L 9/3242; H04L 2209/56

USPC .......................................................... 705/50
See application file for complete search history.

(56) References Cited

U.S. PATENT DOCUMENTS

| | | | | |
|---|---|---|---|---|
| 5,777,383 A | * | 7/1998 | Stager | G01R 31/2884 257/700 |
| 9,495,668 B1 | * | 11/2016 | Juels | G06Q 20/06 |

(Continued)

FOREIGN PATENT DOCUMENTS

| | | |
|---|---|---|
| CN | 103679526 | 3/2014 |
| TW | 548564 | 8/2003 |

OTHER PUBLICATIONS

Satoshi Nakamoto, Bitcoin: A Peer-to-Peer Electronic Cash System, May 24, 2009.*

(Continued)

*Primary Examiner* — John W Hayes
*Assistant Examiner* — Wodajo Getachew
(74) *Attorney, Agent, or Firm* — Banner & Witcoff, Ltd.

(57) ABSTRACT

Mining circuitry may be used to mine digital currency such as bitcoins by computing solutions to a cryptographic puzzle. Successful computation of a solution to the cryptographic puzzle may provide a reward of the digital currency. The mining circuitry may partition the mined reward between a first digital wallet and a second digital wallet. The first digital wallet may be user-provided, whereas the second digital wallet may be hardcoded into the dedicated mining circuitry. The mining circuitry may include control circuitry and multiple processing core circuits. The control circuitry may control the processing cores to solve the cryptographic puzzle via exhaustive search over possible inputs to the cryptographic puzzle.

20 Claims, 12 Drawing Sheets

(56) References Cited

U.S. PATENT DOCUMENTS

| | | | | |
|---|---|---|---|---|
| 2005/0105366 | A1* | 5/2005 | Pedlow | G11C 17/18 365/225.7 |
| 2005/0246257 | A1* | 11/2005 | Zhang | G06Q 40/00 705/35 |
| 2006/0059368 | A1* | 3/2006 | Fayad | G06F 21/87 713/189 |
| 2008/0162850 | A1* | 7/2008 | Zhang | G06F 21/10 711/163 |
| 2009/0049299 | A1* | 2/2009 | Jablon | H04L 9/0618 713/176 |
| 2012/0259698 | A1* | 10/2012 | Yurow | G06Q 20/32 705/14.51 |
| 2013/0065669 | A1* | 3/2013 | Michaelson | G07F 17/3244 463/25 |
| 2013/0166455 | A1* | 6/2013 | Feigelson | H04L 9/3234 705/64 |
| 2014/0093074 | A1* | 4/2014 | Gotze | H04L 9/3278 380/45 |
| 2014/0095383 | A1* | 4/2014 | Rao | G06Q 20/383 705/43 |
| 2014/0143142 | A1* | 5/2014 | Talker | G06Q 30/0641 705/41 |
| 2014/0259028 | A1* | 9/2014 | Atwood | G06F 9/543 719/313 |
| 2014/0264331 | A1* | 9/2014 | Yao | H01L 22/32 257/48 |
| 2015/0170112 | A1* | 6/2015 | DeCastro | G06Q 20/381 705/39 |
| 2015/0262168 | A1* | 9/2015 | Armstrong | G06Q 20/386 705/39 |
| 2015/0269570 | A1* | 9/2015 | Phan | G06Q 20/382 705/71 |

OTHER PUBLICATIONS

Satoshi Nakamoto, Bitcoin: A Peer-to-Peer Electronic Cash System, May 24, 2009, (Year: 2009).*

Satoshi Nakamoto, May 24, 2009, Bitcoin: A Peer-to-Peer Electronic Cash System, (Year: 2009).*

Satoshi Nakamoto, Bitcoin: A Peer-to-Peer Electronic Cash System, published May 24, 2009 (Year: 2009).*

Rahul P. Naik, Optimizing the SHA256 Hashing Algorithm for Faster and More Efficient Bitcoin Mining, Sep. 2, 2013 (Year: 2013).*

Bitcoin: A Peer-to-Peer Electronic Cash System, Satoshi Nakamoto, published May 24, 2009 (Year: 2009).*

Ron White, How Computers Work, Oct. 15, 2003, Paul Boger, Illustrated by Timothy Edward Downs, 7th Edition (Year: 2003).*

Rahul P. Naik (Optimizing the SHA256 Hashing Algorithm for Faster and More Efficient Bitcoin Mining) (Year: 2013).*

Nakamoto, "Bitcoin: A Peer-to-Peer Electronic Cash System", Oct. 31, 2008, XP055131503, Retrieved from the Internet: <URL:http://bitcon.org/bitcon.pdf> [retreived on Jul. 24, 2014].

Barber et al., :Bitter to Better How to Make Bitcoin a Better Currency, Mar. 2, 2012, Financial Cryptography and Data Security, Sprincer Berlin Heildelberg, berlin, Heidelberg, pp. 399-414, XP047013846 ISBN: 978-3-642-32945-6.

"Mining Pool Reward FAQ—Bitcoin Wiki", Jun. 27, 2011, XP055197824, Retrieved from the Internet: <URL:http://en.bitcoin.it/wiki/Mining_poolreward_FAQ> [retrieved on Jun. 23, 2015].

Luu et al., "On Power Splitting Games in Distributed Computation: The Case of Bitcoin Pooled Mining", International Association for Cryptologic Research, vol. Feb. 27, 2015:213542, Feb. 24, 2015, pp. 1-18, XP061018051, [retreived on Feb. 24, 2015].

Hurlburt et al., "Botcoin: Benefit or Curse?" IT Professionals, IEEE Service Center, Los Alamitos, CA, US, vol. 16, No. 3, May 1, 2014, pp. 10-15, XP011551680, ISSN: 1502-9202, DOI: 10.1109/MITP.2014.28 [retrieved on Jun. 17, 2014].

Tucket et al., "Interactive Demonstration: This Is How You Mine Some Bitcoin," Bloomberg Businessweek, Jan. 13, 2014 [Retrieved on Apr. 14, 2014]. Retrieved from the Internet <URL: http://http://www.businessweek.com/printer/articles/185845-interactive-demonstration-this-is-how-you-mine-some-bitcoin>.

Berke et al., "Bitcoin Demystified: A Hacker's Perspective," HuffPost Code, Nov. 25, 2013 [Retrieved on Apr. 14, 2014]. Retrieved from the Internet <URL:http://www.huffingtonpost.com/2013/11/25/bitcoin-basics-explained-_n_4340141.html?view=print&comm_ref=false>.

"Mining," Bitcoin Wiki, Apr. 1, 2014 [Retrieved on Apr. 14, 2014], Retrieved from the Internet <URL:https://en.bitcoin.it/wiki/Mining>.

Nakamoto, "Bitcoin: A Peer-to-Peer Electronic Cash System," www.bitcoin.org [Retrieved on Apr. 14, 2014], Retrieved from the Internet <URL:https://bitcoin.org/bitcoin.pdf>.

"Block," Bitcoin Wiki, Mar. 2, 2014 [Retrieved on Apr. 14, 2014]. Retrieved from the Internet <URL:https://en.bitcoin.it/wiki/Block>.

* cited by examiner

DIGITAL CURRENCY MINING CIRCUITRY

BACKGROUND

This relates to digital currencies, and more particularly, to mining digital currencies.

Digital currencies serve as a digital medium of exchange in which the digital currencies may be transferred in exchange for goods and services. Crypto-currencies are examples of digital currencies in which cryptography governs the creation and exchange of value. An example of a cryptocurrency is the bitcoin cryptocurrency that is governed by the Bitcoin protocol. This is in contrast to traditional mediums of exchange that are governed, for example, by a central authority.

The Bitcoin protocol defines a system in which the creation and distribution of the bitcoin cryptocurrency is governed by consensus among a peer-to-peer network. The network maintains a public ledger in which new transactions are verified and recorded by members of the network via cryptography. The operations of verifying and recording transactions of cryptocurrencies such as transactions in the bitcoin cryptocurrency are sometimes referred to as mining, because completion of each mining operation typically rewards the miner with newly created cryptocurrency (e.g., bitcoins). Verified transactions and newly created bitcoins are recorded in the public ledger. The public ledger serves as an official history of transactions. The amount of cryptocurrency owned by any entity may be determined from the public ledger.

Bitcoin mining operations involve identifying a solution to a cryptographic puzzle in which transactions that are to be verified form part of the puzzle parameters. Bitcoin mining operations are typically performed via brute-force techniques (e.g., an exhaustive search for a puzzle solution performed across all possible solutions). The difficulty of the cryptographic puzzle has led to the use of dedicated circuitry designed specifically for Bitcoin mining. Such dedicated circuitry can be expensive to design, purchase, and operate.

SUMMARY

Dedicated mining circuitry may be used to mine digital currency by completing a function according to the protocol that governs the digital currency. The function may form a cryptographic puzzle such that the dedicated mining circuitry completes the function by computing solutions to the cryptographic puzzle. The mining circuitry may be part of an integrated circuit or electronic device that serves as a node of a network of nodes that collectively govern or support the digital currency. The cryptographic puzzle may be determined by a protocol such as the Bitcoin protocol that is implemented by the network of nodes. Information provided by a user (e.g., a user wallet, user account, user data structure, or other user-provided information) may serve as a parameter of the cryptographic puzzle. A profit-sharing wallet, account, or other data structure may also serve as a parameter of the cryptographic puzzle.

Successful computation of a solution to the cryptographic puzzle may provide a reward of the digital currency. The mining circuitry may partition the mined reward between a first digital wallet and a second, profit-sharing digital wallet. The first digital wallet may be user-provided, whereas the second digital wallet may be hardcoded into the dedicated mining circuitry or provided via authenticated software updates. For example, the second digital wallet may be identified by dedicated logic in the mining circuitry. Each digital wallet may be associated with a respective public-private key pair and the wallets may be identified using the corresponding public key.

The cryptographic puzzle may involve identifying an input block of data to a hash function that produces an output satisfying a predetermined condition. The predetermined condition may determine the difficulty of solving the cryptographic puzzle. The mining circuitry may include control circuitry and multiple processing core circuits. The control circuitry may control the processing cores to solve the cryptographic puzzle via exhaustive search over possible inputs to the cryptographic puzzle. Each input data block may include a constant portion that is based on the transactions to be verified and a variable portion that the core circuits may modify in performing the exhaustive search. The control circuitry may partition the search space of possible input data blocks into portions and assign the portions to respective core circuits.

Profit sharing may help to offset the substantial costs associated with designing the mining circuit. The design costs may be decoupled from operational costs such as electricity costs and maintaining and/or managing a collection of mining devices. Operational profits may be returned to the circuit designer via the profit-sharing wallets hardcoded in the mining circuits.

Further features of the invention, its nature and various advantages will be more apparent from the accompanying drawings and the following detailed description of the preferred embodiments.

DETAILED DESCRIPTION

The present invention relates to mining of digital currencies such as crypto-currencies. Mining circuitry and mining operations described herein may be used for any digital medium of exchange such as digital currencies, credits, rewards, or points. In particular, systems and methods are provided that introduce profit-sharing (reward-sharing) techniques with dedicated cryptocurrency mining circuitry. The profit-sharing techniques are described herein in reference to the Bitcoin protocol. However, it should be understood that profit-sharing techniques may be applied to mining operations for any desired cryptocurrency or other digital mediums of exchange.

Figure 1:
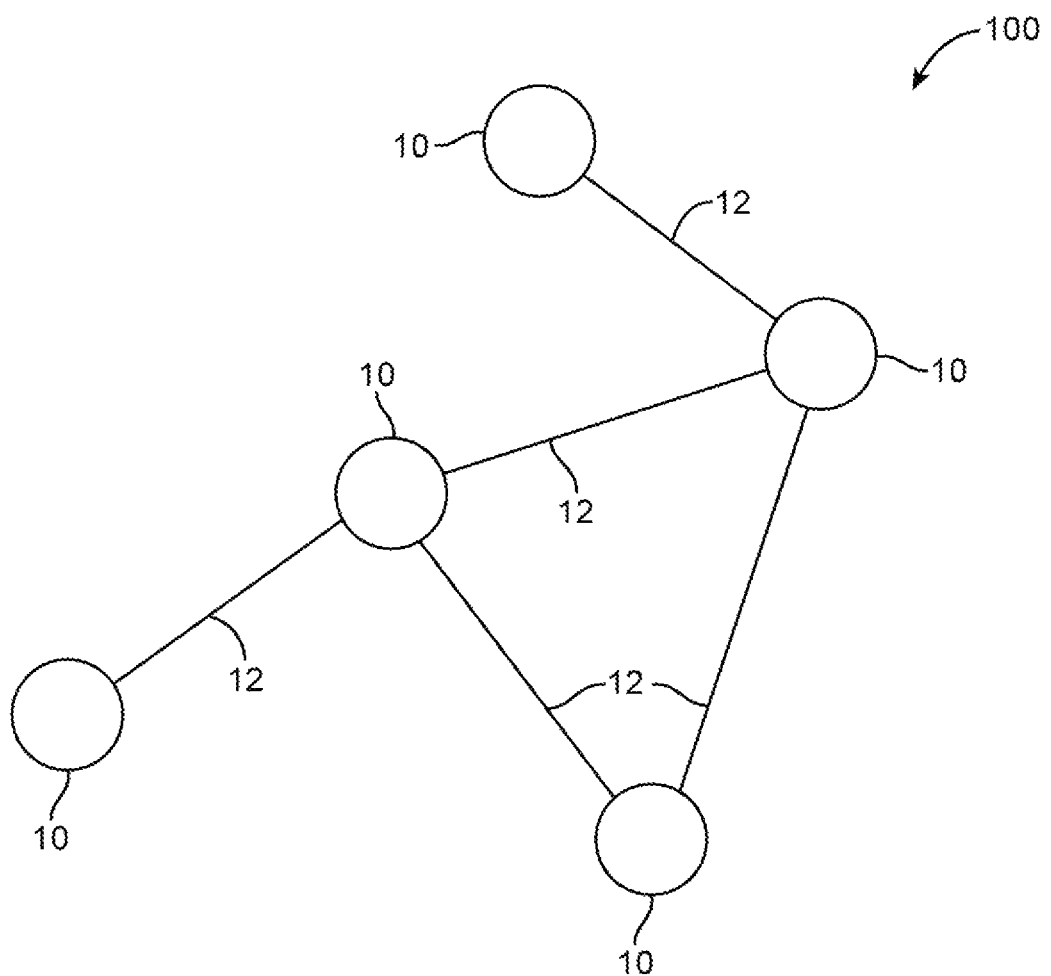
FIG. 1 is an illustrative diagram of a network of nodes that may mine digital currency in accordance with an embodiment of the present invention.

FIG. 1 is an illustrative diagram of a peer-to-peer network 100 that may operate according to the Bitcoin protocol. Network 100 includes nodes 10 that are coupled to other nodes via paths 12. Nodes 10 may be electronic devices such as desktop computers, laptop computers, cellular telephones, servers, or other electronic devices that implement the Bitcoin protocol. Each node 10 may communicate with other nodes of network 100 over paths 12. Paths 12 may, for example, include network paths such as network cables and packet forwarding devices (e.g., switches, routers, etc.) that couple nodes 10 to other nodes. This example is merely illustrative. Nodes 10 of network 100 may be coupled via any desired underlying communications technology such as wired or wireless network technologies and network 100 may include any desired number of nodes (e.g., tens, hundreds, thousands, millions, or more).

Nodes 10 may communicate over paths 12 according to the Bitcoin protocol in maintaining the cryptocurrency. For example, nodes 10 may communicate to maintain a global ledger of all official transactions. Each node 10 may store a copy of the global ledger (e.g., a complete copy or only a partial copy). Transactions added to the global ledger by each node 10 may be verified by other nodes 10 to help ensure validity of the ledger.

Figure 2:
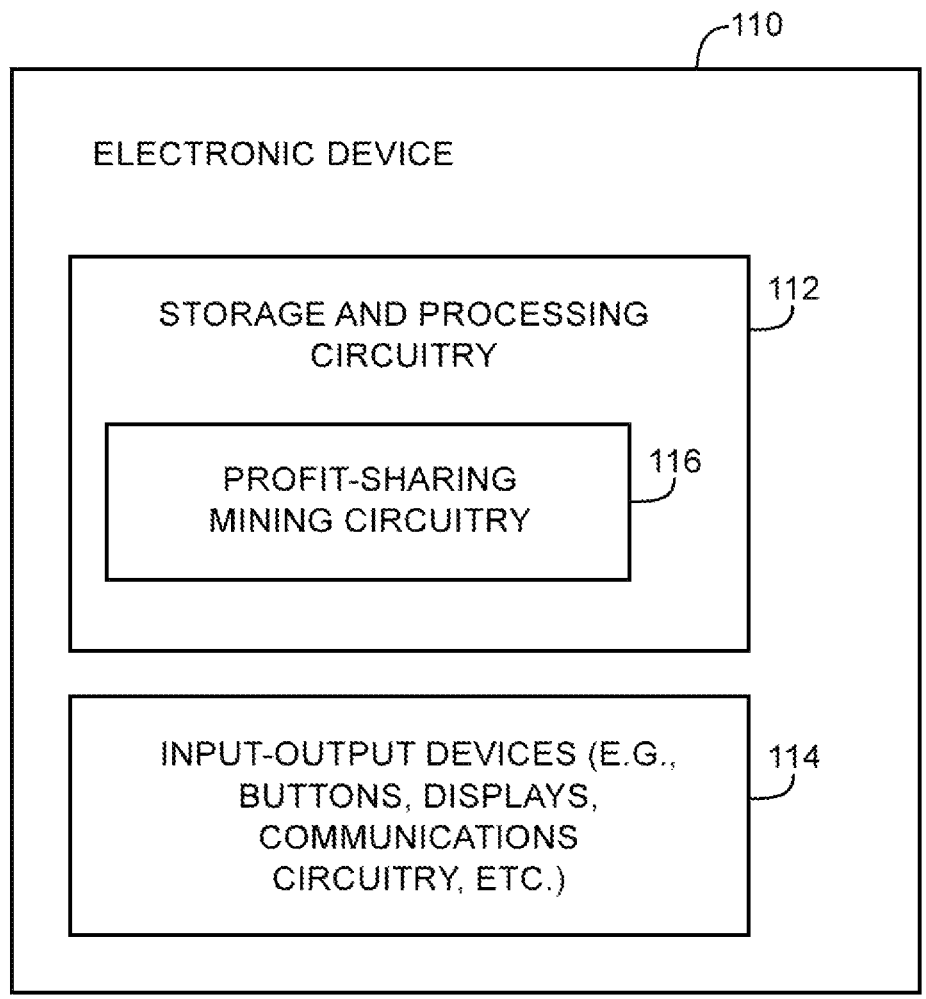
FIG. 2 is an illustrative diagram of an electronic device that may include profit-sharing mining circuitry in accordance with an embodiment of the present invention.

FIG. 2 is an illustrative diagram of an electronic device 110 that may serve as a node in a peer-to-peer network (e.g., as a node 10 of FIG. 1). As shown in FIG. 2, device 10 may include storage and processing circuitry 112. Storage and processing circuitry 112 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 112 may be used to control the operation of device 10. This processing circuitry may be based on one or more general purpose processing circuits such as microprocessors, microcontrollers, and digital signal processors, or dedicated processing circuits such as application specific integrated circuits, etc.

Device 10 may be provided with input-output devices 114 such as buttons, speakers, microphones, displays, and other input-output devices that accommodate user interaction with device 110. Input-output devices 114 may include communications circuitry for communicating with other devices (e.g., other nodes of a cryptocurrency network).

Profit-sharing mining circuitry 116 is an example of dedicated processing circuitry that may be included in electronic device 110. Mining circuitry 116 may perform mining operations such as verifying cryptocurrency transactions while sharing any rewards or the mining operations between multiple entities (e.g., a user of the device, an entity associated with the profit-sharing mining circuitry, etc.). Mining circuitry 116 may ensure that the rewards are shared by recording the shared rewards in the global ledger. Profit-sharing mining circuitry 116 may, for example, be an integrated circuit chip. Electronic device 110 may include one or more of these chips that may be operated together or independently.

Electronic device 110 may be a desktop computer, a server in a rack-based system, a portable electronic device such as a tablet computer, laptop computer, or a cellular telephone. These examples are merely illustrative. Profit-sharing mining circuitry 116 may be provided to any desired electronic device that can communicate with other nodes of a cryptocurrency network. For example, a flash drive that connects with a computer may be provided with profit-sharing mining circuitry 116. In this scenario, the profit-sharing mining circuitry 116 may operate to perform mining operations by utilizing computer resources when the flash drive is connected to a computer (e.g., by utilizing power from the computer and a network connection between the computer and nodes of a cryptocurrency network).

Figure 3:
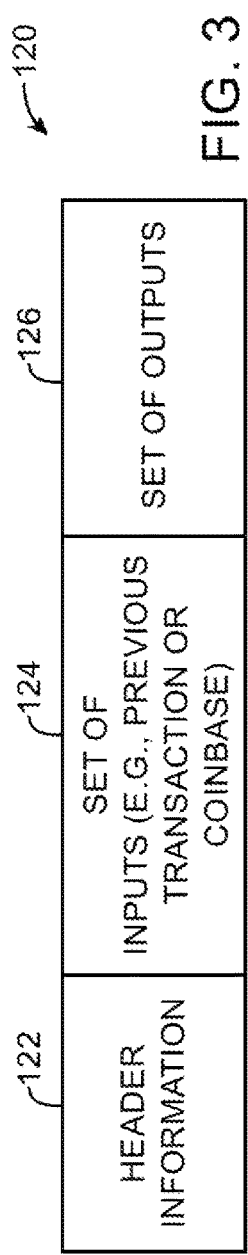
FIG. 3 is an illustrative transaction of digital currency that may be verified with profit-sharing mining circuitry in accordance with an embodiment of the present invention.

FIG. 3 is a diagram of an illustrative cryptocurrency transaction 120 that may be verified using profit-sharing mining circuitry such as circuitry 116 of FIG. 2. As shown in FIG. 3, transaction 120 may include header information 122, a set of one or more inputs 124, and a set of one or more outputs 126.

Header information 122 may include one or more header fields including information that helps to identify the transaction. For example, the header fields may include a version number identifying the version of the Bitcoin protocol that is used. As another example, the header fields may include a current timestamp and/or other information on the transaction.

Digital currency may be stored in digital wallets that serve as sources or destinations of transactions. For example, a transaction may transfer funds from a source wallet to a destination wallet. Digital wallets may be formed using any desired data structure and may sometimes be referred to as digital accounts. Wallets may be identified using encryption schemes such as public-key cryptography in which a public-private key pair is assigned to each wallet. The public key of a wallet may serve to publicly identify the wallet (e.g., a public address to which funds may be directed), whereas the private key may be used by the owner of the wallet to sign transactions (e.g., thereby verifying the authenticity of the transactions).

Transaction 120 may identify an input 124 (e.g., a source of funds) and a set of outputs (e.g., destinations). The inputs and outputs may, for example, be digital wallets in which currency is stored. The inputs may refer to an output of a previous transaction as a source of funding or may identify that transaction 120 is an originating transaction that creates new currency (sometimes referred to as a coinbase transaction).

Figure 4:
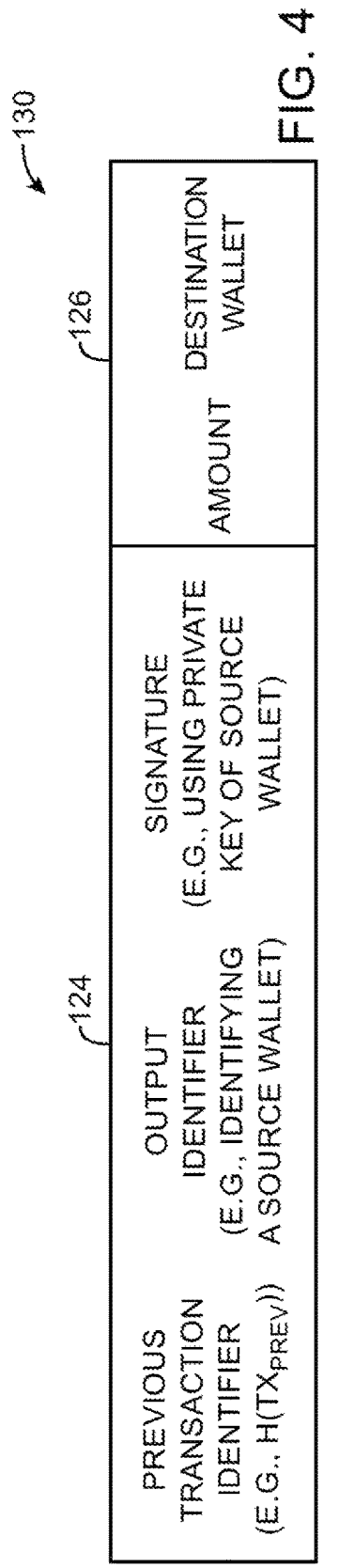
FIG. 4 is an illustrative transaction of digital currency between source and destination wallets that may be verified with profit-sharing mining circuitry in accordance with an embodiment of the present invention.

FIG. 4 is a diagram of an illustrative transaction 130 that transfers currency from a source wallet to a destination wallet. As shown in FIG. 4, input 124 may include a previous transaction identifier, an output identifier, and a signature. If desired, header information 122 of FIG. 3 such as version number or timestamp information may be included in the transaction of FIG. 5.

The previous transaction identifier may identify which transaction of the global ledger contains the source wallet. The previous transaction identifier may, if desired, identify the previous transaction TXPREV by a hash (e.g., H(TXPREV)) or double-hash (e.g., H(H(TXPREV))) of the previous transaction. The output identifier may identify which output of the identified previous transaction serves as the source wallet of transaction 130. For example, the outputs 126 of the previous transaction may be enumerated and the index of the source wallet may serve as the output identifier.

Transaction 130 may be signed to help ensure authenticity of the transaction. For example, the private key of the source wallet may be used to encrypt transaction 130 or a portion of transaction 130 to generate the signature that is stored in transaction 130. The public key of the source wallet may be used by others (e.g., other network nodes) to decrypt the signature and confirm the authenticity of the transaction.

The set of outputs 126 identifies one or more destination wallets and a respective amount to transfer from the source wallet to each destination wallet. In the example of FIG. 4, the transaction includes one destination wallet and a corresponding amount to be transferred from the source wallet to the destination wallet. Multiple destination wallets (e.g., two, three, four, or more) may be listed along with corresponding amounts to be transferred to each destination wallet from the source wallet. If desired, the source wallet identified by input 124 may also be listed as a destination wallet. For example, the amount to be transferred to the destination wallet may be less than the amount identified by the output of the previous transaction as belonging to the source wallet. In this scenario, the difference between the amount of the source wallet and the transfer amount may be assigned to the source wallet as an additional output entry. If desired, the amount assigned in outputs 126 to the source wallet may be less than the difference between the originally stored amount and the transfer amount. In this scenario, the difference between original source amount and the sum of amounts in output 126 may serve as additional reward for any miner that verifies the transaction (e.g., in addition to any predetermined reward defined by the cryptocurrency protocol).

Figure 5:
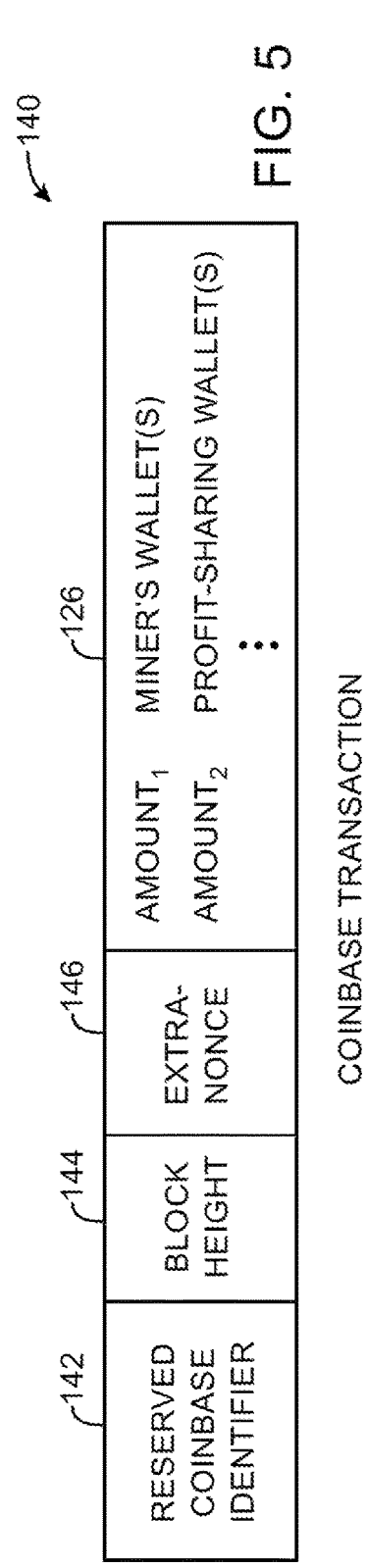
FIG. 5 is an illustrative coinbase transaction in which a portion of a reward amount is assigned to a profit-sharing wallet in accordance with an embodiment of the present invention.

FIG. 5 is an illustrative diagram of an originating transaction (i.e., coinbase transaction) that may generate new digital currency. As shown in FIG. 5, transaction 140 includes information that identifies the transaction as a coinbase transaction. The information may include a reserved coinbase identifier 142, a block height 144, and an extra-nonce value 146. If desired, header information 122 of FIG. 3 such as version number or timestamp information may be included in the transaction of FIG. 5.

Reserved coinbase identifier 142 may be a value that is reserved for coinbase transactions. Block height 144 may help identify where the coinbase transaction is located within the global ledger (e.g., which block of a block chain that represents the global ledger). Extra-nonce value 146 is an arbitrary value that may be modified during mining operations.

In contrast to normal transactions such as transaction 130 of FIG. 4, coinbase transaction 140 does not provide a source of funds for outputs 126. Instead, coinbase transaction 140 may create new currency. The amount of new currency created is determined by the cryptocurrency protocol. For example, nodes of the cryptocurrency network may communicate and establish an agreed-upon reward that is created for verifying transactions. The agreed-upon reward may be determined based on the size of the global ledger (e.g., how many recorded blocks are in the global ledger). As an example, the reward for verifying and recording transactions in the Bitcoin protocol may reward a number of bitcoins (units of currency) such as 25 bitcoins. This example is merely illustrative, as the number of bitcoins rewarded may be less than 25 (e.g., 12.5, 6.25, etc.) or may even be zero.

New currency that is created in a coinbase transaction may be divided between multiple destination wallets. During mining operations performed by profit-sharing mining circuitry, the profit-sharing circuitry assigns a portion of the new currency to one or more predetermined wallets that have been assigned to the profit-sharing mining circuitry (e.g., hardcoded in the dedicated circuitry). For example, a percentage of the new currency such as 50% (or any desired percentage) may be assigned to the predetermined wallets. The predetermined wallets may sometimes be referred to herein as profit-sharing wallets or reward-sharing wallets. The remainder of the new currency may be assigned to one or more user wallets such as wallets of the miners that are operating the profit-sharing mining circuitry. The user wallets may be provided as an input by the miners to the profit-sharing mining circuitry (e.g., using input-output devices such as input-output devices 114 of FIG. 2).

Consider the scenario in which 25 new bitcoins are created for verifying a set of transactions. In this scenario, the profit-sharing mining circuitry may assign half (12.5) of the reward to a miner's wallet as AMOUNT1 and half of the reward to a predetermined wallet as AMOUNT2. This example is merely illustrative. The reward may be divided in any desired proportion between the miner's wallet(s) and the profit-sharing wallet(s).

In some scenarios, transactions that are verified using mining circuitry may include fees. For example, transaction 130 of FIG. 4 may assign fewer bitcoins to destination wallets than contained in the source wallet. In this scenario, the remainder may serve as fees (e.g., an additional reward) for a miner. This additional reward may be assigned to the miner's wallet in coinbase transaction 140 or may also be partitioned by the profit-sharing mining circuitry between the miner's wallets and the profit-sharing wallets.

Figure 6:
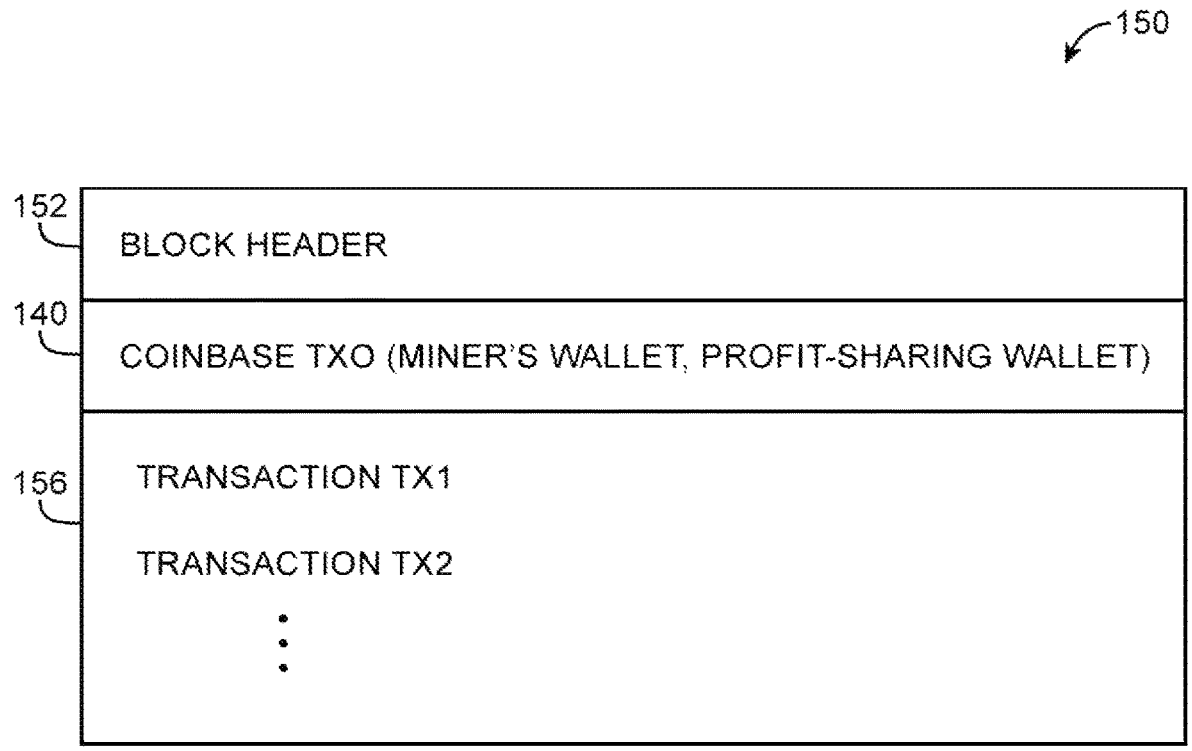
FIG. 6 is an illustrative block that may be generated by profit-sharing mining circuitry and recorded in a global ledger in accordance with an embodiment of the present invention.

In performing mining operations to verify and record a set of transactions, profit-sharing mining circuitry may generate a block to be recorded in the global ledger as shown in FIG. 6. Block 150 of FIG. 6 may include block header 152, coinbase transaction TX0 (e.g., a coinbase transaction 140), and a set of transactions 156 to be recorded. Coinbase transaction TX0 may partition newly created currency between the miner's wallet and the profit-sharing wallet. The sum of additional rewards associated with transactions TX1 and TX2 of set 156 may be assigned to the miner's wallet or a portion may be assigned to the profit-sharing wallet.

Figure 7:
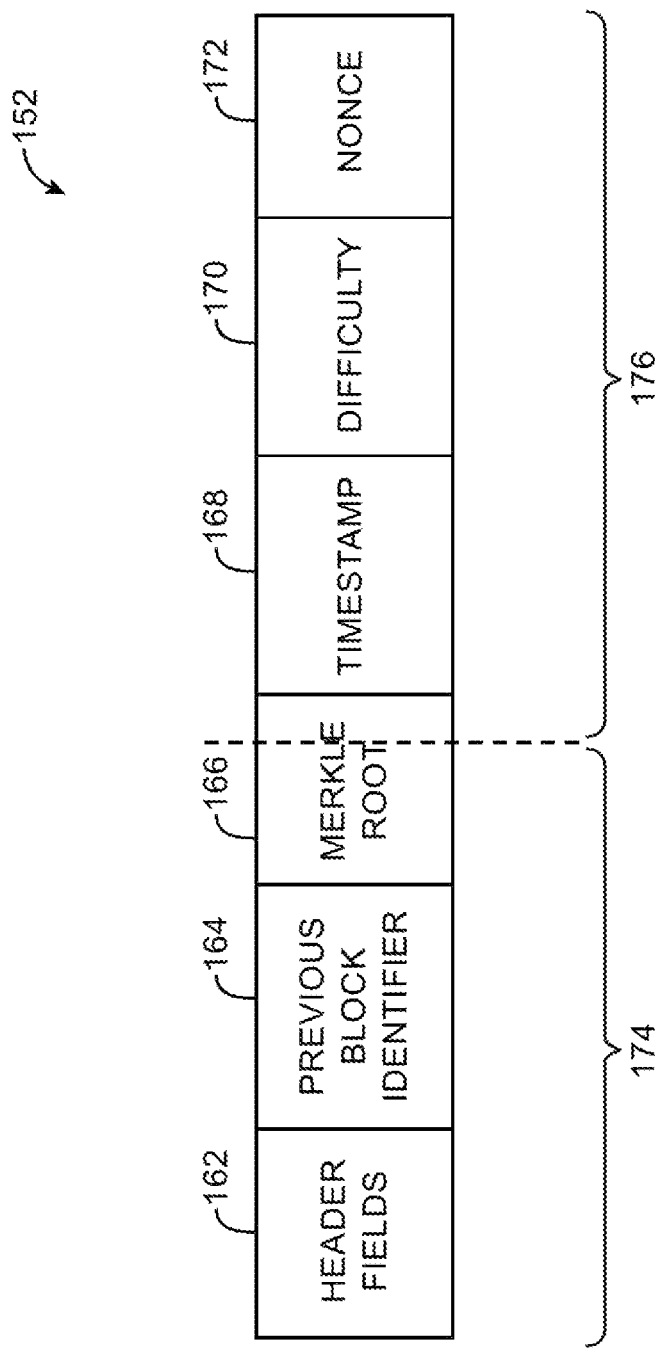
FIG. 7 is an illustrative block header that may be generated by profit-sharing mining circuitry in solving a cryptographic puzzle in accordance with an embodiment of the present invention.

Block header 152 may include information that identifies block 150 and additional information generated by the profit-sharing mining circuitry to complete a function such as information satisfying a cryptographic puzzle. The additional information may be generated to solve the function (e.g., puzzle) for a given set of function inputs that are at least partially determined by block header 152 and for a desired output or range of outputs. FIG. 7 is a diagram of an illustrative block header 152. As shown in FIG. 7, block header 152 may include header fields 162, a previous block identifier 164, a Merkle root 166, a timestamp 168, a difficulty value 170, and a nonce value 172.

Header fields 162 may include any desired header fields such as a version number of the Bitcoin protocol. Previous block identifier 164 may identify a previous block in the global ledger (e.g., the global ledger may be a chain of blocks 152 in which each block references a previous block in the chain). For example, the previous block identifier may be a hash of the block header of the previous block.

Merkle root 166 may be generated from the transactions of block 150 including coinbase transaction 140 and the set of transactions 156. Merkle root 166 may provide a compact representation of the transactions in block 150. For example, Merkle root 166 may be a 256-bit (32 Byte) value, whereas the transactions of block 150 may be hundreds, thousands, or millions of bytes.

Difficulty value 170 is a parameter of the function (e.g., cryptographic puzzle) that is solved with block 150. For the Bitcoin protocol, the cryptographic puzzle involves generating block header 152 such that the hash of block header 152 is less than a predetermined value. The hash may be calculated using a protocol-determined hash function such as the Secure Hash Algorithm (SHA). The predetermined value may depend on difficulty value 170. For example, difficulty value 170 may specify how many leading zeros in a binary data representation are required in the hashed block header value.

Profit-sharing mining circuitry may adjust one or more of the fields in block header 152 in order to provide block header 152 with a hash value that solves the cryptographic puzzle (e.g., a sufficiently small hash value). For example, the mining circuitry may adjust the nonce value or the timestamp value. As another example, the mining circuitry may adjust the extra-nonce value in the coinbase transaction of the block, which indirectly adjusts the Merkle root. The profit-sharing mining circuitry may perform exhaustive search by iterating over all possible solutions to the cryptographic puzzle.

Hash functions used by the cryptographic puzzle may operate in sequential steps (sometimes referred to as stages or blocks) on block header 152. In the SHA function, a first portion 174 of block header 152 may be processed in a first stage, whereas a second portion 176 of block header 152 may be processed in a second, subsequent stage. Portion 174 may include header fields 162, previous block identifier 164, and a first portion of Merkle root 166, whereas portion 176 may include a second portion of Merkle root 166, timestamp 168, difficulty value 170, and nonce value 172. The SHA function may produce an output value for the first stage based on portion 174 of block header 152. The output value of the first stage may serve as an input to the second stage of the SHA function along with portion 176 of block header 152. The second stage of the SHA function may produce the hash value of block header 152.

Figure 8:
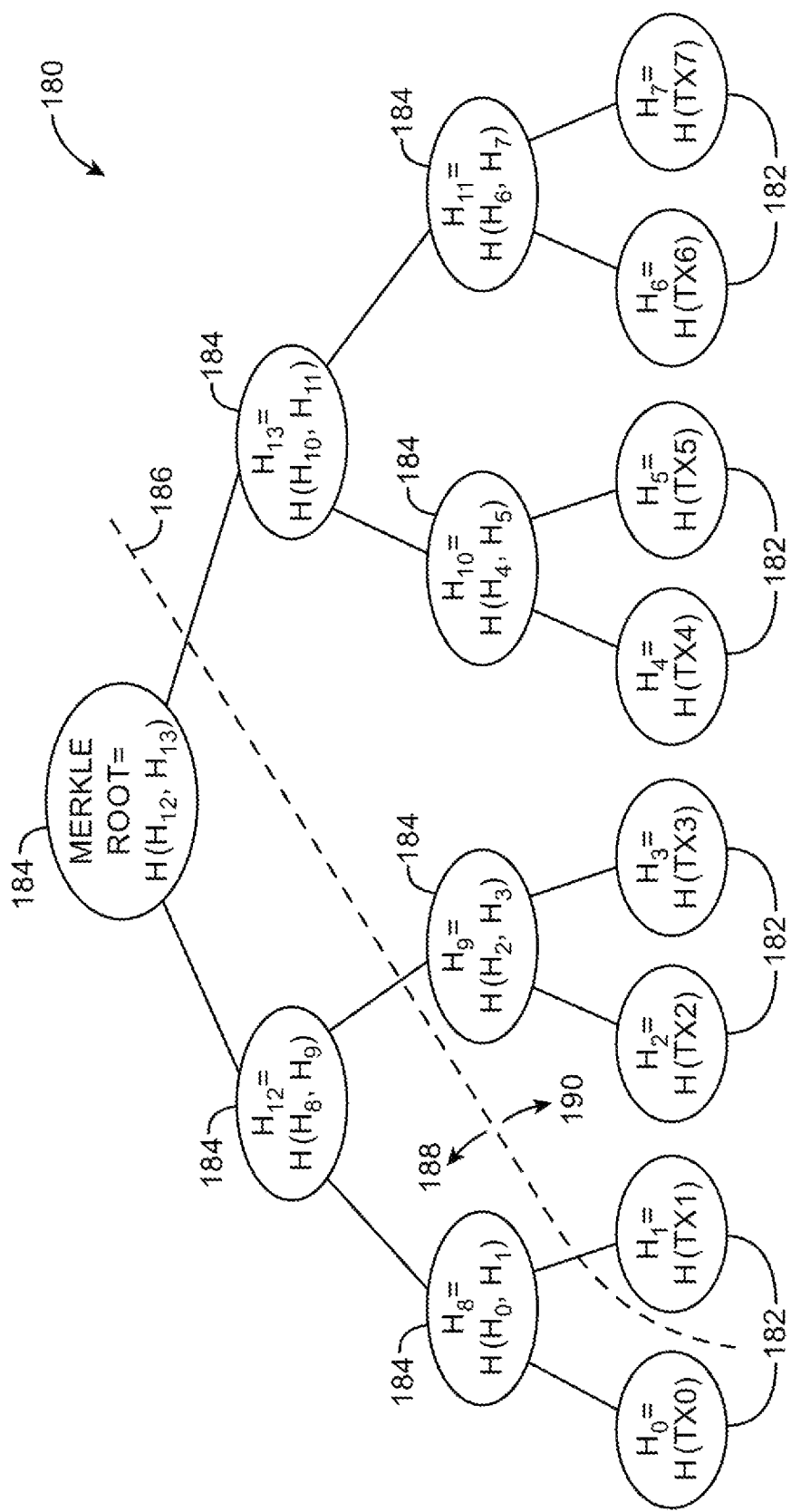
FIG. 8 is an illustrative Merkle tree that may be calculated by profit-sharing mining circuitry from a set of transactions in solving a cryptographic puzzle in accordance with an embodiment of the present invention.

Merkle root 166 may be computed by generating a Merkle tree from the transactions of the corresponding block 150. FIG. 8 is a diagram of an illustrative Merkle tree 180 generated from a block including transactions TX0, TX1, TX2, TX3, TX4, TX5, TX6, and TX7. The example of FIG. 8 in which the block includes eight transactions is merely illustrative. A Merkle tree may be computed from any binary number of transactions (e.g., 2, 4, 6, 8, etc.). If a block does not contain a binary number of transactions, placeholder transactions may be added to complete the Merkle tree. Such placeholder transactions are used only in generating the Merkle tree and are not added to the block.

As shown in FIG. 8, Merkle tree 180 includes leaf nodes 182 that are each generated by computing the hash of a respective transaction (e.g., using the SHA function). For example, hash value H0 is computed from the hash of transaction TX0 (e.g., a coinbase transaction), whereas hash values H1, H2, H3, H4, H5, H6, and H7 are computed from transactions TX1, TX2, TX3, TX4, TX5, TX6, and TX7, respectively.

Merkle tree 180 may be organized as a binary tree in which each non-leaf node 184 has two child nodes. The nodes of each successive level of the tree may be computed by hashing nodes of a lower (previous) level. The second level of the tree (e.g., the nodes storing hash values H8, H9, H10, and H11) may be generated by hashing the values stored in leaf nodes 182. For example, hash value H8 is generated by concatenating leaf values H0 and H1 and hashing the concatenated result. Similarly, the third level of the tree may be generated by hashing the values of the second level (e.g., hash value H12 may be calculated by hashing the concatenation of H8 and H9, whereas hash value H13 may be calculated by hashing the concatenation of H10 and H11). The number of levels in the tree may depend on the number of transactions in the block. In the example of FIG. 8, the root of Merkle tree 180 is at the fourth level and is calculated from hashing values H12 and H13.

The hashed value at each node of Merkle tree 180 has a fixed, predetermined size (e.g., 256 bits), and is dependent on the values at the children of that node. The Merkle root therefore serves as a compact representation of all of the transactions in the corresponding block, because any changes to a transaction percolate upwards to the Merkle root. For example, changes to coinbase transaction TX0 causes hash value H8 to change, which modifies hash value H12, which then modifies the Merkle root value. Similarly, changes to any of the transactions result in changes to the Merkle root value.

Profit-sharing mining circuitry may generate Merkle tree 180 while searching for solutions to a cryptographic puzzle. For example, in iterating through extra-nonce values in a coinbase transaction TX0, the mining circuitry may need to re-compute the Merkle root for each new extra-nonce value. To help reduce computation time and improve performance, the mining circuitry may re-compute only a portion of Merkle tree 180 during each iteration. In particular, changes to coinbase transaction TX0 only affect hash values H0, H8, H12, and the Merkle root, whereas the remaining nodes of the Merkle tree are unchanged. Dotted line 186 represents the edge of the Merkle tree that separates hash values that need to be recomputed and hash values that remain unchanged when modifying coinbase transaction TX0. Nodes to the left of edge 186 need to be recomputed (portion 188 of tree 180), whereas nodes to the right of edge 186 do not need to be recomputed (portion 190 of tree 180). The mining circuitry can store the constant nodes at edge 186 and reuse the stored values to re-compute the Merkle root. In the example of FIG. 8, hash values H1, H9, and H13 may be stored, whereas the remaining hash values of tree portion 190 do not need to be stored.

Figure 9:
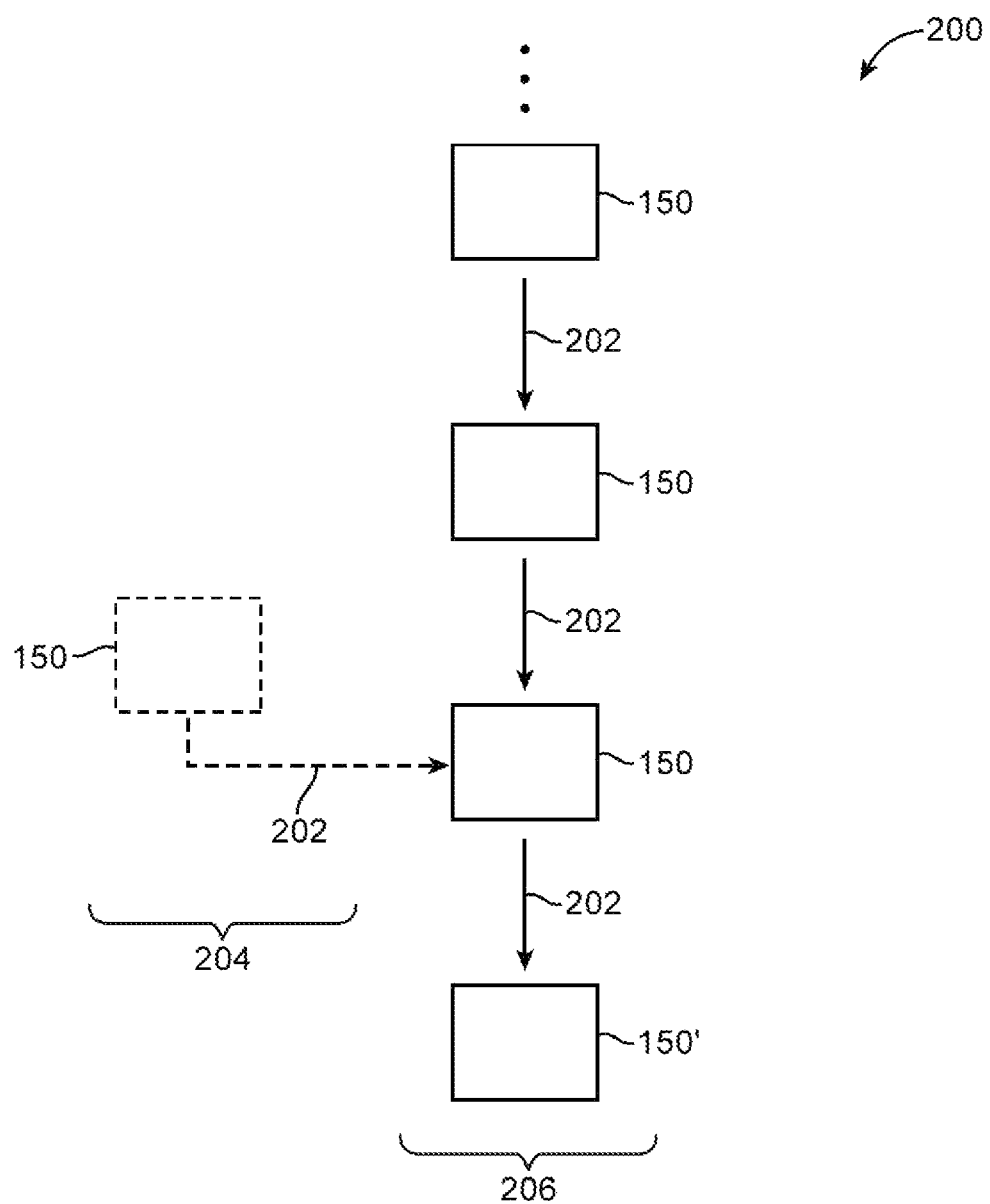
FIG. 9 is an illustrative block chain that may be maintained by a network of nodes as a global ledger of digital currency transactions in accordance with an embodiment of the present invention.

FIG. 9 is an illustrative diagram of a global ledger that is formed from a block chain 200. As shown in FIG. 9, block chain 200 may include an originating block 150' that does not point to any previous block. For example, the previous block identifier 164 of block 150' does not identify any other blocks. Each successive block 150 identifies the previous block in the chain as shown by arrows 202 (e.g., the previous block identifier 164 of each block identifies the previous block in block chain 200).

During mining operations, a device collects a set of transactions that have not already been recorded in block chain 200. The mining circuitry may identify the last (most recently recorded) block in block chain 200. The mining circuitry may subsequently generate a new block 150 from the set of transactions such that the new block includes an identifier 164 that identifies the last block of block chain 200 and solves the cryptographic puzzle of the cryptocurrency protocol used by the block chain.

It is possible for block chain 200 to include multiple branches. For example, branch 204 may be generated when different puzzle solutions are discovered that each have the same previous block identifier. In this scenario, the branch that is longer and includes more blocks serves as the global register. In other words, branch 204 is ignored and the transactions in block 150 of branch 204 are not considered to be recorded, because branch 206 includes more blocks than branch 204 (i.e., four connected blocks in branch 206 compared to only three in branch 204).

Figure 10:
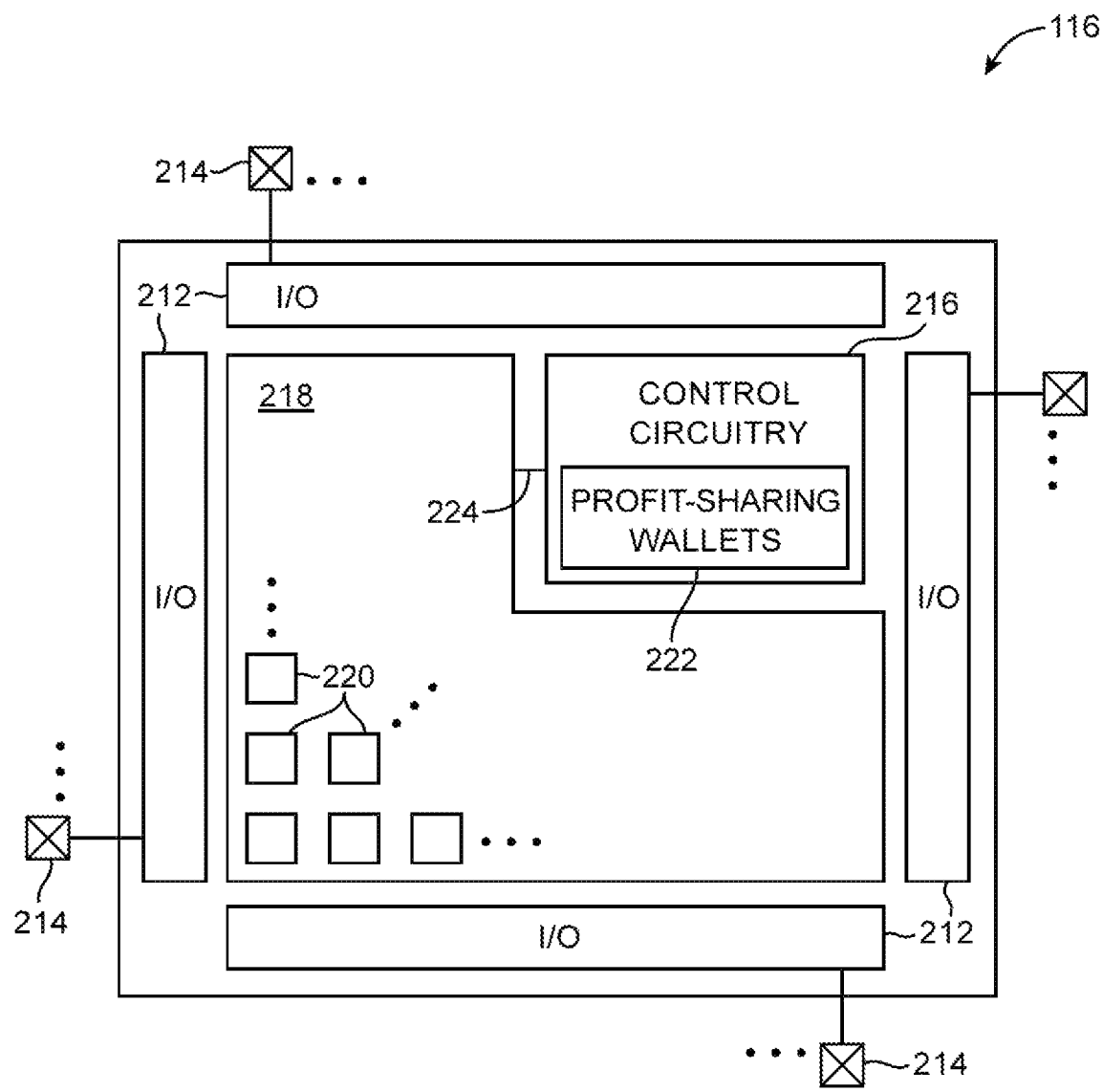
FIG. 10 is an illustrative diagram of profit-sharing mining circuitry including control circuitry and multiple processing cores in accordance with an embodiment of the present invention.

Profit-sharing mining circuitry such as circuitry 116 of FIG. 2 may be implemented as a dedicated integrated circuit (e.g., an application-specific integrated circuit) as shown in the diagram of FIG. 10. As shown in FIG. 10, integrated circuit 116 may have input-output (I/O) circuitry 212 for driving signals off of device 116 and for receiving signals from other devices via input-output pins 214. For example, I/O circuitry 212 and pins 214 may convey signals between mining circuitry 116 and other circuitry on electronic device 110 of FIG. 2.

Mining circuitry 116 may include a core region 218 and control circuitry 216 that is coupled to the core region by paths 224 such as interconnect paths. Core region 218 may include multiple core circuits 220 that may be controlled by control circuitry 216 to identify solutions to a cryptographic puzzle. For example, each core circuit 220 may include dedicated logic that performs the SHA function on inputs provided by control circuitry 216 over paths 224. Core region 218 may include any desired number of core circuits that are operated in parallel by control circuitry 216 (e.g., tens, hundreds, or more core circuits).

The inputs provided by control circuitry 216 to a given core 220 may include a partially filled block header. For example, the partially filled block header may include header fields 162, previous block identifier 164, a current time, and difficulty value 170. The inputs may include the Merkle root of the transactions of the block to be solved, the transactions themselves, or sufficient information for computing the Merkle root (e.g., Merkle tree edge 186 of FIG. 8). The remaining fields of the block header and block may be generated by core 220 in attempting to solve the cryptographic puzzle with inputs provided by the control circuitry.

One or more profit-sharing wallets 222 may be hardcoded into the dedicated profit-sharing mining circuitry during design and fabrication of the mining circuitry. For example, the public keys of the profit-sharing wallets may be identified using hardware description language (HDL) such as Verilog in designing the dedicated mining circuitry. In this scenario, design tools such as synthesis tools and place and route tools may be used to convert the HDL description of the dedicated mining circuitry to a circuit layout. The circuit layout may be used to generate a set of photo masks that are used in fabricating the dedicated mining circuitry with the hard-coded public keys (e.g., using fabrication tools such as lithography). In other words, dedicated logic in the mining circuitry may identify the profit-sharing wallets. The information in the dedicated logic is generally not accessible to any users. Examples of how profit-sharing wallets may be hardcoded into dedicated profit-sharing mining circuitry include mask programming, selectively shorting pins of the integrated circuit chip (chip-level hardcoding) or solder bumps of an integrated circuit package (package-level hardcoding) to a positive power supply or a power supply ground, permanently programming fuses or anti-fuses, or storing in non-volatile memory. If desired, hardcoding of profit-sharing wallets may be provided at a board level such as configuring jumpers on a motherboard to which the dedicated profit-sharing mining circuitry is mounted.

The profit-sharing wallets (e.g., the public keys) may be retrieved and used by control circuitry 216 or core circuits 220 in generating coinbase transactions and sharing rewards between a users' wallet and the profit-sharing wallets. Hardcoding the profit-sharing wallets in dedicated circuitry may help to protect the profit-sharing functionality (e.g., from being replaced by a user with a different wallet).

Figure 11:
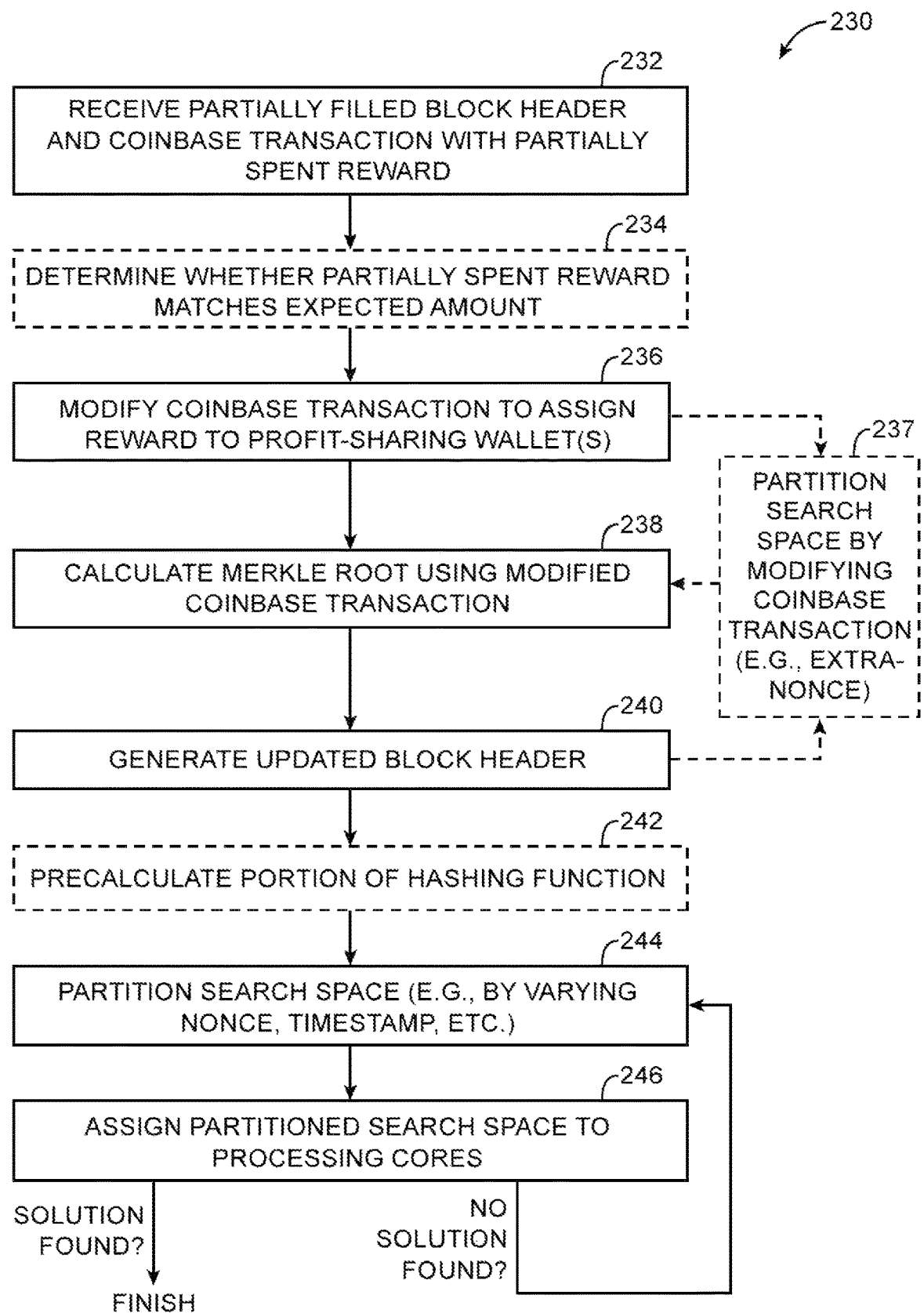
FIG. 11 is a flow chart of illustrative steps that may be performed by control circuitry of profit-sharing mining circuitry to assign search spaces of a cryptographic puzzle to processing cores in accordance with one embodiment of the present invention.

Control circuitry 216 may partition the search space of possible solutions to the cryptographic puzzle and assign each core circuit 220 a different portion of the search space. The search space may be partitioned based on the inputs provided by the control circuitry to the core circuits. FIG. 11 is a flow chart 230 of illustrative steps that may be performed by control circuitry in controlling core circuits to perform profit-sharing mining operations.

During step 232, the control circuitry may receive a partially filled block header that has a partially spent reward. For example, the control circuitry may receive block header 152 of FIG. 7 from a user that includes only information for header fields 162, previous block identifier 164, a current time, and difficult value 170. The control circuitry may receive information sufficient to compute the Merkle tree root for filling the block header (e.g., the transactions of the block, hashes of each transaction of the block, or a Merkle tree edge).

The control circuitry may receive a coinbase transaction in which the user has assigned a portion of the block reward to a user wallet. If desired, the control circuitry may receive only information identifying the user wallet (e.g., a public key) and the reward need not be partially spent. In this scenario, the control circuitry may calculate the appropriate reward amounts to assign to the user wallet and to the profit-sharing wallet(s). If desired, additional information such as block height of the global ledger may be received by the control circuitry.

During optional step 234, the control circuitry may optionally determine whether the partially spent reward matches an expected amount. The control circuitry may determine the expected amount based on the protocol-defined reward amount and the configured proportion of profit-sharing. The protocol-defined reward amount may be variable and depend on factors such as the block height. For example, if the control circuitry is configured for 50% profit sharing and the protocol-defined reward amount is 25 bitcoins, then the control circuitry may calculate the expected amount as (1−0.50)*25 bitcoins=12.5 bitcoins and the reward amount assigned to user wallets in the coinbase transaction should total 12.5 bitcoins.

Step 234 is merely optional and may be omitted. In scenarios in which the control circuitry does not compare the user-assigned reward amounts to expected amounts, the control circuitry may proceed directly to step 236 from step 232.

During step 236, the control circuitry may modify the coinbase transaction to assign a portion of the available reward to one or more profit-sharing wallets (e.g., hardcoded wallets 222 of FIG. 10). The portion of the available reward may be a percentage (e.g., 50%) or may be a fixed amount of digital currency (e.g., one bitcoin). The control circuitry may divide the portion of the available reward among the profit-sharing wallets or may assign the portion of the available reward to a single profit-sharing wallet. As an example, the control circuitry may divide the portion of the available reward equally or non-equally among the profit-sharing wallets. As another example, the control circuitry may select one of the profit-sharing wallets according to an arbitration scheme such as round-robin or randomly.

During step 238, the control circuitry may calculate the Merkle root using the modified coinbase transaction. The Merkle root may be calculated as described in connection with FIG. 8.

During step 240, the control circuitry may generate an updated block header that includes the calculated Merkle root.

During optional step 242, the control circuitry may pre-calculate a portion of the hashing function. In the scenario that the hashing function is the SHA function, the control circuitry may compute the first stage of the SHA function. For example, the control circuitry may compute the output associated with portion 174 of the block header as described in connection with FIG. 7. Portion 174 of the block header includes header fields 162, previous block identifier 164, and a portion of Merkle root 166. Optional step 242 may be performed when core circuits do not modify portion 174 of the header block when solving the cryptographic puzzle and, in this scenario, may help improve performance because the core circuits do not have to calculate the first stage of the SHA function and merely receive the calculated first stage output from control circuitry 222. In other words, portion 174 of the block header may be constant across the search space for solving the cryptographic puzzle.

During step 244, the control circuitry may partition the search space for solving the cryptographic puzzle. For example, the control circuitry may vary the nonce ranges (e.g., range of nonce values 172 of FIG. 7) and/or timestamp ranges (e.g., range of timestamp values 168 of FIG. 7) that are assigned to each processing core.

If desired, the control circuitry may partition the search space by adjusting the extra-nonce values in the coinbase transaction during optional step 237 (e.g., extra-nonce value 146 of FIG. 5). For example, the control circuitry may perform optional step 237 subsequent to step 236 to modify the extra-nonce value of the coinbase transaction. The control circuitry may then perform steps 238 and 240 for each different extra-nonce value to generate different block headers for the cores.

During step 246, the control circuitry may assign the partitioned search space to the processing cores. The control circuitry may provide the updated block header as generated during step 240 (and, if desired, the pre-calculated portion of the hashing function) to the processing cores and direct each processing core to exhaustively search for solutions to the cryptographic puzzle across the portion of the search space that is assigned to that processing core. If a solution is found by any of the processing cores, the operations of flow chart 230 may be complete. If no solutions are found by any given processing core after it has exhausted its assigned search space, the control circuitry may return to step 244 to partition and assign another portion of the total search space to that processing core.

Figure 12:
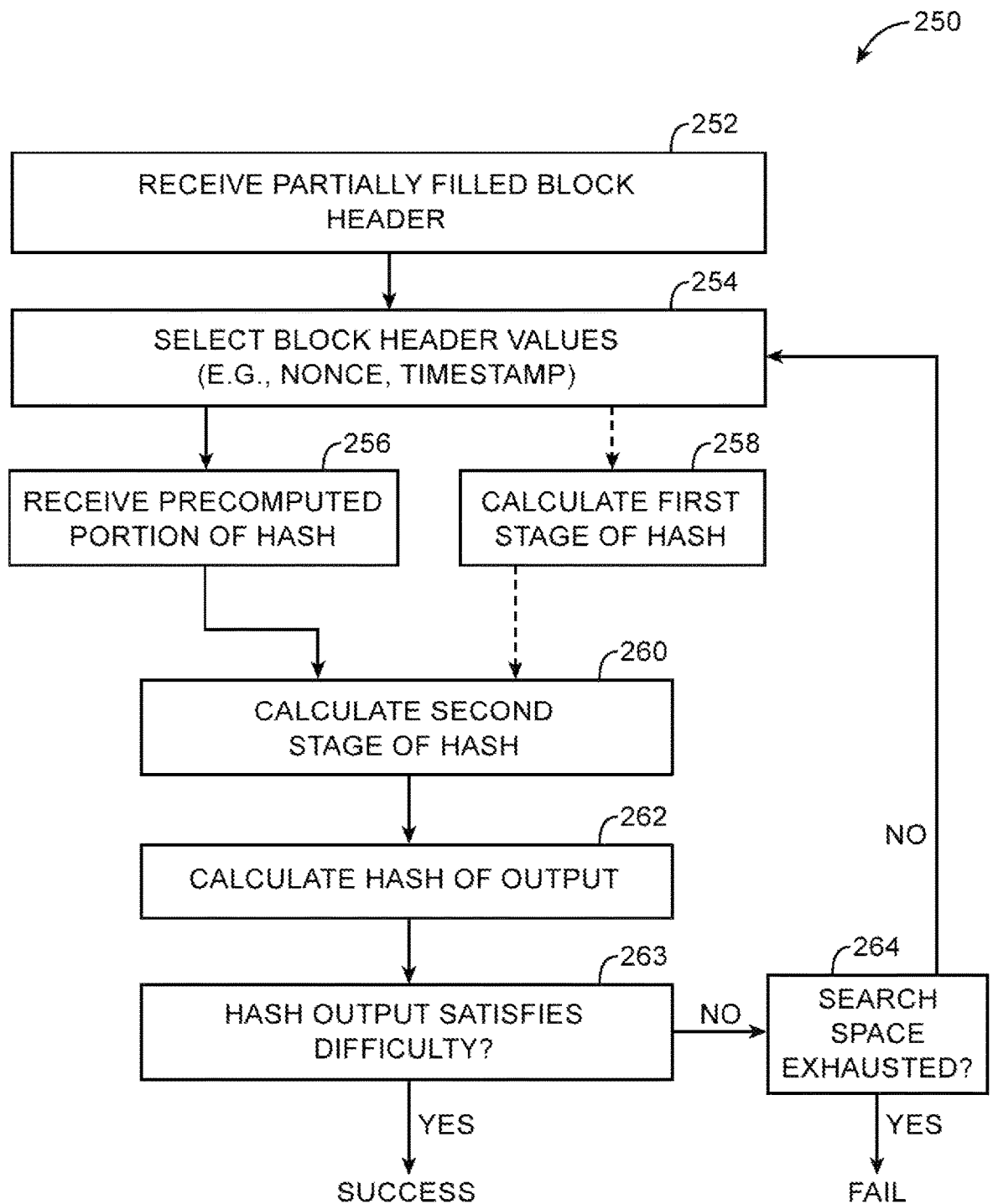
FIG. 12 is a flow chart of illustrative steps that may be performed by a processing core of profit-sharing mining circuitry to perform exhaustive search across an assigned search space to identify a solution to a cryptographic puzzle in accordance with one embodiment of the present invention.

Processing cores such as cores 220 of FIG. 10 may be configured to solve any desired cryptographic puzzle. FIG. 12 is a flow chart 250 of illustrative steps that may be performed by a processing core in solving the cryptographic puzzle defined by the Bitcoin protocol. In the example of FIG. 12, the cryptographic puzzle involves computing a double-hash of a Bitcoin block header (i.e., a hash of a hash of the block header) and determining whether the double-hash output value satisfies the puzzle conditions (e.g., difficulty). The hash may be computed using the SHA function.

During step 252, the processing core may receive a partially filled block header. For example, the processing core may receive the partially filled block header from control circuitry during step 246 of FIG. 11 (e.g., the partially filled block header may have been generated during step 240 of FIG. 11). If desired, the processing core may receive information from the control circuitry that indicates a search space such as a range of values that should be used in attempting to solve the cryptographic puzzle.

During step 254, the processing core may select block header values to generate a complete block header. The block header values may be selected from a search space such as provided by control circuitry or determined at the processing core. Block header values that may be selected include nonce values (e.g., nonce values 172 of FIG. 7) and/or timestamp values (e.g., timestamp value 168 of FIG. 7).

During step 256, a pre-computed portion of the hash may be received. The pre-computed portion may be the output of a first stage of the hash function such as the first stage of the SHA function that has been pre-calculated by control circuitry (e.g., during step 242 of FIG. 11). In scenarios in which no pre-computed portion of the hash is available, optional step 258 may be performed instead of step 256 to calculate the first stage of the hash function with the processing core.

During step 260, the processing core may calculate a second stage of the hash function using the output of the first hash function stage (e.g., the pre-computed portion from step 256 or the output of step 258). Referring to the example of FIG. 7, the processing core may calculate a second stage of the hash function with portion 176 of block header 152 and the hash of portion 174 as inputs.

During step 262, the processing core may compute the hash of the output of step 260 (i.e., a second hash). The output of step 262 is the double-hashed output of the block header as may be required by the Bitcoin cryptographic puzzle.

During step 263, the processing core may determine whether the double-hashed output satisfies the difficulty as identified in the partially filled block header. For example, the difficulty may identify a maximum value that the double-hashed output must not exceed. The maximum value may be determined by specifying a number of most-significant-bit (MSB) bits of the double-hashed output that are required to be logic zero. If the double-hashed output satisfies the difficulty, the current block header having values selected during step 254 is produced as a successful solution and may be provided to control circuitry. If the double-hashed output fails to satisfy the difficulty, the processing core may determine whether the assigned search space has been exhausted (e.g., whether all possible block header values have been processed during steps 254-263). In response to determining that unprocessed block header values remain, the process may return to step 254 to process the remaining block header values. In response to determining that the assigned search space has been exhausted, the processing core may determine that no solutions to the cryptographic puzzle exist within the assigned search space and inform the control circuitry.

If desired, the difficulty of the cryptographic puzzle solved by processing cores may be different from the difficulty value specified in the block header. In some scenarios, electronic devices with mining circuitry may be grouped to form a pool of devices. Devices may be pooled, for example, to help increase the likelihood that the pool as a whole will be the first to discover a valid solution and add to the public ledger. In this scenario, individual devices may be assigned different difficulty values based on the processing capabilities of that device.

Figure 13:
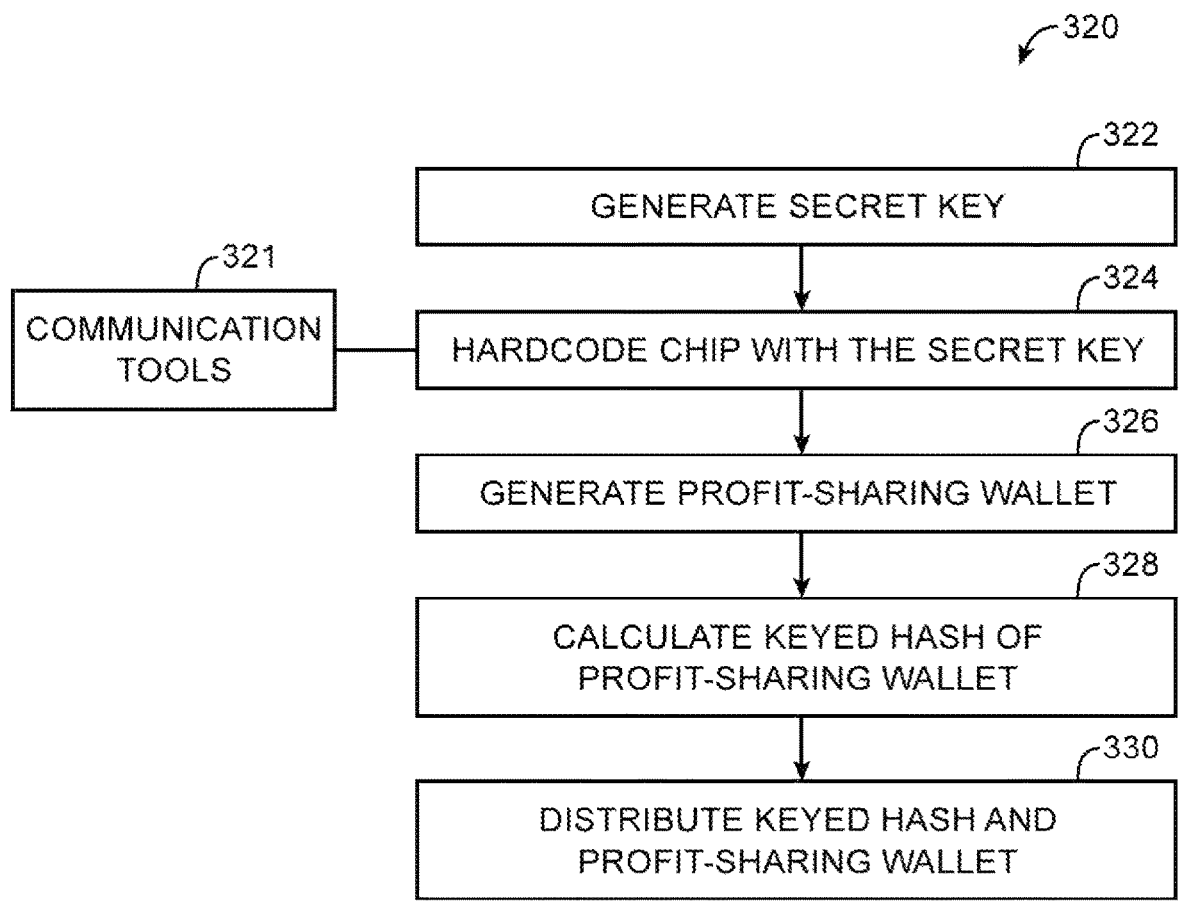
FIG. 13 is a flow chart of illustrative steps that may be performed using computing equipment to provide profit-sharing wallets via software in accordance with one embodiment of the present invention.

The example of FIG. 10 in which profit-sharing wallets are hardcoded on mining circuitry is merely illustrative. If desired, profit-sharing wallets may be distributed via software. In this scenario, it may be desirable to provide the mining circuitry with authentication capabilities to ensure that only authenticated profit-sharing wallets are accepted. FIG. 13 is a flow chart 320 of illustrative steps that may be performed in distributing a profit-sharing wallet via software. The steps of flow chart 320 may be performed using computing equipment that may include one or more processors and storage.

During step 322, the computing equipment may generate a secret key. During subsequent step 324, configuration tools 321 may be used to hardcode the mining circuitry chip (integrated circuit) with the secret key (e.g., similarly to how a profit-sharing wallet may be hardcoded into the mining circuitry). During step 326, the computing equipment may generate a profit-sharing wallet such as a public-private key pair. During step 328, the computing equipment may generate a keyed hash using the profit-sharing wallet and the secret key. For example, the computing equipment may calculate a hash such as SHA from a combination of the public key of the profit-sharing wallet and the hardcoded secret key to generate a keyed hash value. The computing equipment may distribute the profit-sharing wallet along with the corresponding keyed hash value to users of the mining circuitry chip.

Figure 14:
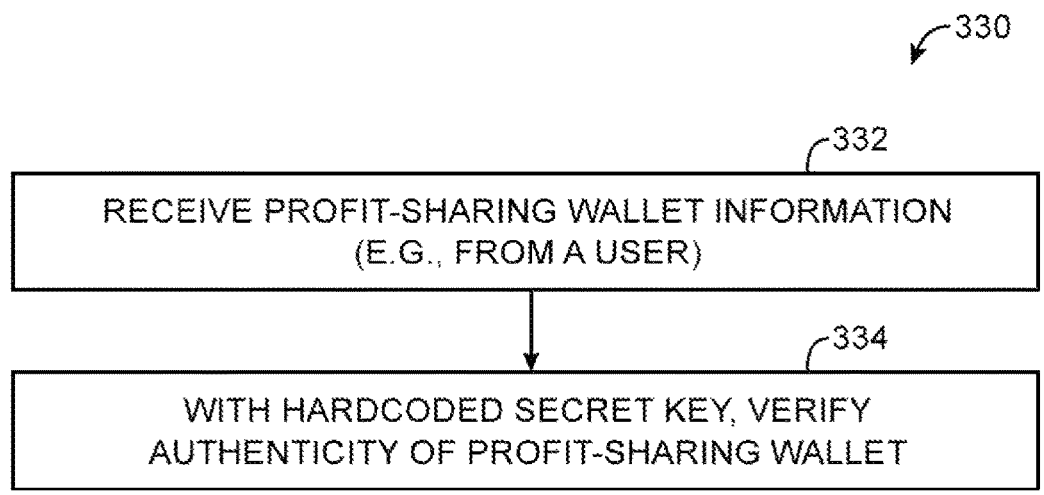
FIG. 14 is a flow chart of illustrative steps that may be performed by profit-sharing mining circuitry to authenticate a profit-sharing wallet using a hardcoded secret key in accordance with one embodiment of the present invention.

FIG. 14 is a flow chart 330 of illustrative steps that may be performed using a mining circuitry chip to authenticate profit-sharing keys in a software distribution arrangement (e.g., via authenticated software updates to the mining circuitry). During step 332, the mining circuitry may receive profit-sharing wallet information such as the public key of a profit-sharing wallet and a corresponding keyed hash value. During subsequent step 334, the mining circuitry may use a hardcoded secret key to verify the authenticity of the profit-sharing wallet. For example, the mining circuitry may re-calculate the keyed hash from the profit-sharing wallet and the secret key and compare the calculated value to the provided value. In response to determining that the calculated value matches the provided value of the keyed hash, the mining circuitry may operate normally. In response to determining that the calculated value does not match the provided value, the mining circuitry may generate an error and/or prevent use of the received profit-sharing wallet. By providing the mining circuitry with a secret key that is used in verifying public keys, the mining circuitry may be provided with authentication capabilities.

Figure 15:
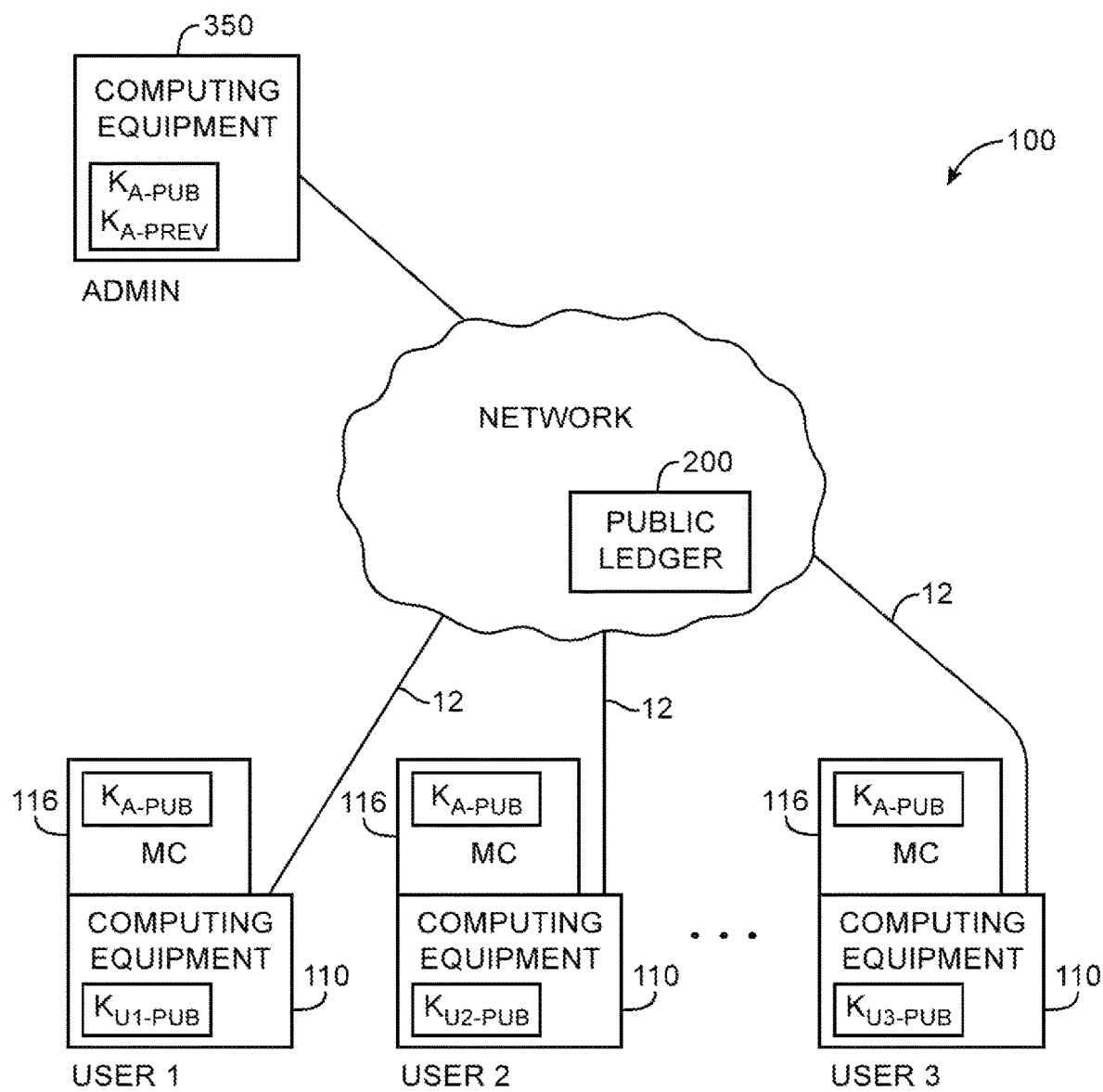
FIG. 15 is a diagram of an illustrative system in which mining circuits are operated by respective users for reward-sharing with an administrator in accordance with one embodiment of the present invention.

Mining circuits may be distributed to users that operate the mining circuits in generating digital currency. An administrator that distributes the mining circuits may own one or more administrator wallets or accounts that are assigned to the mining circuits to serve as profit-sharing wallets. FIG. 15 is a diagram of a network in which an administrator wallet is distributed to mining circuits of multiple users.

As shown in FIG. 15, multiple users such as USER1, USER2, and USER3 may each operate a respective computing equipment 110 having mining circuitry 116. Each user may have a respective wallet that is identified by storage at computing equipment 110. Each user may have a public-private key pair that forms a wallet owned by that user. As an example, USER1 stores public key KU1-PUB to identify the wallet of USER1, USER2 stores public key KU2-PUB, and USER3 stores public key KU3-PUB. The users may provide information identifying the user wallets (e.g., the public keys) to the computing equipment via any desired input devices (e.g., keyboards, mice, touch screens, touch pads, or other user input devices).

The users may operate the computing equipment and the mining circuitry at the computing equipment to mine digital currency. For example, USER1 may operate computing equipment 110 to provide public key KU1-PUB to mining circuitry 116. Mining circuitry 116 at the computing equipment may attempt to verify pending transactions retrieved from network 100 (e.g., by completing a function or cryptographic puzzle).

The mining circuit of each user is assigned one or more administrative public keys that are owned by an administrator and serve as profit-sharing wallets. In the example of FIG. 15, administrator ADMIN owns an administrator wallet formed from a public-private key pair (i.e., private key KA-PRIV and public key KA-PUB). The administrator has provided the mining circuitry of each user with administrative public key KA-PUB (e.g., via hardcoding or via an authenticated software update). In verifying pending transactions to generate a reward, mining circuitry 116 assigns a portion of the reward to user-provided key KU1-PUB and to reward-sharing key KA-PUB. The verified transactions and the assignments of the reward are stored at public ledger 200 that is maintained by network 100.

In the reward-sharing arrangement of FIG. 15, administrator ADMIN may operate computing equipment 350 that is coupled to network 100. For example, computing equipment 350 may be a node of network 100. Information on the administrative wallet such as the public-private key pair may be stored at the computing equipment. Digital currency is assigned via reward-sharing operations that are performed remotely by mining circuitry 116 that has been distributed by the administrator. As an example, the administrator may have designed and/or manufactured mining circuits 116 and distributed the mining circuits to multiple users (e.g., USER1, USER2, and USER3). The users merely operate the mining circuits and are provided with a portion of any rewards, whereas the administrator is also provided with a portion of the rewards via reward-sharing.

The foregoing is merely illustrative of the principles of this invention and various modifications can be made by those skilled in the art without departing from the scope and spirit of the invention. The foregoing embodiments may be implemented individually or in any combination.

What is claimed is:

1. A cryptographic mining integrated circuit configured to:
generate an originating transaction, wherein the originating transaction comprises first output data that comprises a first output amount and an identifier for a first digital wallet of a user of a system, and second output data that comprises a second output amount and an identifier for a second digital wallet hardcoded into the cryptographic mining integrated circuit;
generate a block header based on the originating transaction;
generate a blockchain block that comprises the block header and the originating transaction; and
send the generated blockchain block to a peer-to-peer network in accordance with a digital cryptocurrency protocol.

2. The cryptographic mining integrated circuit of claim 1, wherein the cryptographic mining integrated circuit is further configured to generate the block header by computing solutions to a cryptographic function based on the originating transaction.

3. The cryptographic mining integrated circuit of claim 2, wherein the cryptographic mining integrated circuit comprises a first cryptographic mining processing core and a second cryptographic mining processing core for computing solutions to the cryptographic function, and
wherein the cryptographic mining integrated circuit is further configured to compute solutions to the cryptographic function by assigning a first search space to a first cryptographic mining processing core and a second search space to a second cryptographic mining processing core.

4. The cryptographic mining integrated circuit of claim 3, wherein the first cryptographic mining processing core performs a search for the solutions to the cryptographic function across the first search space and wherein the second cryptographic mining processing core performs a search for the solutions to the cryptographic function across the second search space.

5. The cryptographic mining integrated circuit of claim 4, wherein the cryptographic function performed by the first and second cryptographic mining processing cores comprises a hashing function.

6. The cryptographic mining integrated circuit of claim 1, wherein the cryptographic mining integrated circuit is further configured to receive additional information and generate a Merkle tree root value based on the additional information and the originating transaction, and wherein the block header comprises the Merkle tree root value.

7. The cryptographic mining integrated circuit of claim 6, wherein the additional information comprises a Merkle tree edge and wherein the cryptographic mining integrated circuit is further configured to generate the Merkle tree root value based on the Merkle tree edge and the originating transaction.

8. The cryptographic mining integrated circuit of claim 1, wherein the digital cryptocurrency protocol comprises a bitcoin protocol.

9. The cryptographic mining integrated circuit of claim 1, wherein the cryptographic mining integrated circuit is further configured to perform a simple hash algorithm (SHA) function on the block header.

10. The cryptographic mining integrated circuit of claim 1, wherein the cryptographic mining integrated circuit is an application-specific integrated circuit (ASIC).

11. The cryptographic mining integrated circuit of claim 1, wherein the cryptographic mining integrated circuit is further configured to partition a reward associated with the originating transaction into the first output amount and the second output amount.

12. A method comprising:
generating, by a cryptographic mining integrated circuit, an originating transaction, wherein the originating transaction comprises first output data that comprises a first output amount and an identifier for a first digital wallet of a user of a system, and second output data that comprises a second output amount and an identifier for a second digital wallet hardcoded into the cryptographic mining integrated circuit;
generating, by the cryptographic mining integrated circuit, a block header based on the originating transaction;
generating, by the cryptographic mining integrated circuit, a blockchain block that comprises the block header and the originating transaction; and
causing, by the cryptographic mining integrated circuit, sending the generated blockchain block to a peer-to-peer network in accordance with a digital cryptocurrency protocol.

13. The method of claim 12, wherein the generating the block header comprises computing solutions to a cryptographic function based on the originating transaction.

14. The method of claim 13, wherein:
the cryptographic mining integrated circuit comprises a first cryptographic mining processing core and a second cryptographic mining processing core for computing solutions to the cryptographic function, and
the computing solutions comprises assigning a first search space to a first cryptographic mining processing core and a second search space to a second cryptographic mining processing core.

15. The method of claim 14, wherein:
the first cryptographic mining processing core performs a search for the solutions to the cryptographic function across the first search space, and
the second cryptographic mining processing core performs a search for the solutions to the cryptographic function across the second search space.

16. The method of claim 15, wherein the cryptographic function performed by the first and second cryptographic mining processing cores comprises a hashing function.

17. The method of claim 12, further comprising:
receiving additional information; and
generating a Merkle tree root value based on the additional information and the originating transaction, wherein the block header comprises the Merkle tree root value.

18. The method of claim 17, wherein the additional information comprises a Merkle tree edge, the method further comprising:
generating the Merkle tree root value based on the Merkle tree edge and the originating transaction.

19. The method of claim 12, further comprising:
partitioning a reward associated with the originating transaction into the first output amount and the second output amount.

20. An application specific integrated circuit (ASIC) storing instructions which, when executed by one or more processors, causing:
generating an originating transaction, wherein the originating transaction comprises first output data that comprises a first output amount and an identifier for a first digital wallet of a user of a system, and second output data that comprises a second output amount and an identifier for a second digital wallet hardcoded into the application specific integrated circuit;
generating a block header based on the originating transaction;
generate a blockchain block that comprises the block header and the originating transaction; and
sending the generated blockchain block to a peer-to-peer network in accordance with a digital cryptocurrency protocol.

\* \* \* \* \*